(12) United States Patent
Ide et al.

(10) Patent No.: US 11,642,715 B2
(45) Date of Patent: May 9, 2023

(54) FORMING DEVICE AND METAL PIPE

(71) Applicant: SUMITOMO HEAVY INDUSTRIES, LTD., Tokyo (JP)

(72) Inventors: Akihiro Ide, Ehime (JP); Masayuki Ishizuka, Ehime (JP); Norieda Ueno, Tokyo (JP); Kimihiro Nogiwa, Ehime (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 109 days.

(21) Appl. No.: 17/015,953

(22) Filed: Sep. 9, 2020

(65) Prior Publication Data
US 2020/0406329 A1 Dec. 31, 2020

Related U.S. Application Data

(63) Continuation of application No. PCT/JP2019/004279, filed on Feb. 6, 2019.

(30) Foreign Application Priority Data

Mar. 9, 2018 (JP) .............................. JP2018-043315

(51) Int. Cl.
*B21D 26/00* (2006.01)
*B21D 22/02* (2006.01)
(Continued)

(52) U.S. Cl.
CPC .......... *B21D 22/025* (2013.01); *B21D 26/041* (2013.01); *B21D 26/043* (2013.01); *B21D 26/047* (2013.01); *F16L 9/003* (2013.01)

(58) Field of Classification Search
CPC .... B21D 26/02; B21D 26/033; B21D 26/039; B21D 26/047; B21D 26/041
See application file for complete search history.

(56) References Cited

U.S. PATENT DOCUMENTS 8,171,769 B2   5/2012  Barthelemy et al.
2016/0279693 A1* 9/2016 Ueno ................... B21D 26/047
(Continued)

FOREIGN PATENT DOCUMENTS

CA   2 970 239 A1   6/2016
JP   2002-273526 A   9/2002
(Continued)

OTHER PUBLICATIONS

Search Report issued in European Application No. 19763997.4, dated Mar. 5, 2021.
(Continued)

*Primary Examiner* — Debra M Sullivan
(74) *Attorney, Agent, or Firm* — Michael Best & Friedrich LLP

(57) ABSTRACT

A forming device which expands a metal pipe material to form a metal pipe having a pipe portion and a flange portion includes first and second dies paired with each other and including pipe forming surfaces for forming the pipe portion and flange forming surfaces for forming the flange portion, a drive unit that drives at least one of the first and second dies, and a controller that controls the drive unit, in which, on at least one of the flange forming surfaces of the first and second dies, a protrusion portion protruding by an amount not to abut against the other flange forming surface when the dies are closed is formed and the controller controls the drive unit to form a thin wall portion at which a thickness of the flange portion becomes partially small at the flange portion by the protrusion portion pressing the flange portion.

19 Claims, 8 Drawing Sheets

(51) Int. Cl.
  *B21D 26/041*  (2011.01)
  *B21D 26/043*  (2011.01)
  *B21D 26/047*  (2011.01)
  *F16L 9/00*    (2006.01)

(56) References Cited

U.S. PATENT DOCUMENTS

2017/0122466 A1* 5/2017 Sakakibara ......... F24F 13/0263
2019/0344321 A1* 11/2019 Nogiwa ............... B21D 22/025

FOREIGN PATENT DOCUMENTS

| JP | 2006-000922 A  | 1/2006  |
| JP | 2006-061944 A  | 3/2006  |
| JP | 2016-129891 A  | 7/2016  |
| JP | 2016-190248 A  | 11/2016 |
| WO | 2005-075279 A1 | 8/2005  |

OTHER PUBLICATIONS

International Search Report issued in Application No. PCT/JP2019/004279, dated May 14, 2019.
Office Action issued in Canadian Application No. 3,090,375, dated Mar. 11, 2022.

* cited by examiner

FORMING DEVICE AND METAL PIPE

RELATED APPLICATIONS

The contents of Japanese Patent Application No. 2018-043315, and of International Patent Application No. PCT/JP2019/004279, on the basis of each of which priority benefits are claimed in an accompanying application data sheet, are in their entirety incorporated herein by reference.

BACKGROUND

Technical Field

Certain embodiments of the present invention relate to a forming device and a metal pipe.

Description of Related Art

The related art discloses a forming device in which a metal pipe material is expanded and a metal pipe is formed by means of a forming die. For example, in the case of a forming device disclosed in the related art, it is possible to form a metal pipe having a pipe portion and a flange portion. In the forming device, a metal pipe is formed by disposing a metal pipe material that is electrically heated in the forming die and expanding the metal pipe material while forming a flange portion with the forming die closed.

SUMMARY

According to an embodiment of the present invention, there is provided a forming device which expands a metal pipe material to form a metal pipe having a pipe portion and a flange portion, the forming device including a first die and a second die, which are paired with each other and include pipe forming surfaces for formation of the pipe portion and flange forming surfaces for formation of the flange portion, a drive unit that drives at least one of the first die and the second die, and a controller that controls the drive unit, in which, on at least one of the flange forming surface of the first die and the flange forming surface of the second die, a protrusion portion that protrudes by an amount not to abut against the other flange forming surface when the dies are closed is formed, and the controller controls the drive unit such that a thin wall portion at which a thickness of the flange portion becomes partially small is formed at the flange portion by the protrusion portion pressing the flange portion.

According to another embodiment of the present invention, there is provided a metal pipe including a pipe portion and a flange portion, in which the flange portion includes a thin wall portion at which a thickness of the flange portion becomes partially small.

BRIEF DESCRIPTION OF THE DRAWINGS

FIG. 2A is a view showing a state where the electrode holds a metal pipe material, FIG. 2B is a view showing a state where a gas supply nozzle is pressed against the electrode, and FIG. 2C is a front view of the electrode.

DETAILED DESCRIPTION

Figure 1:
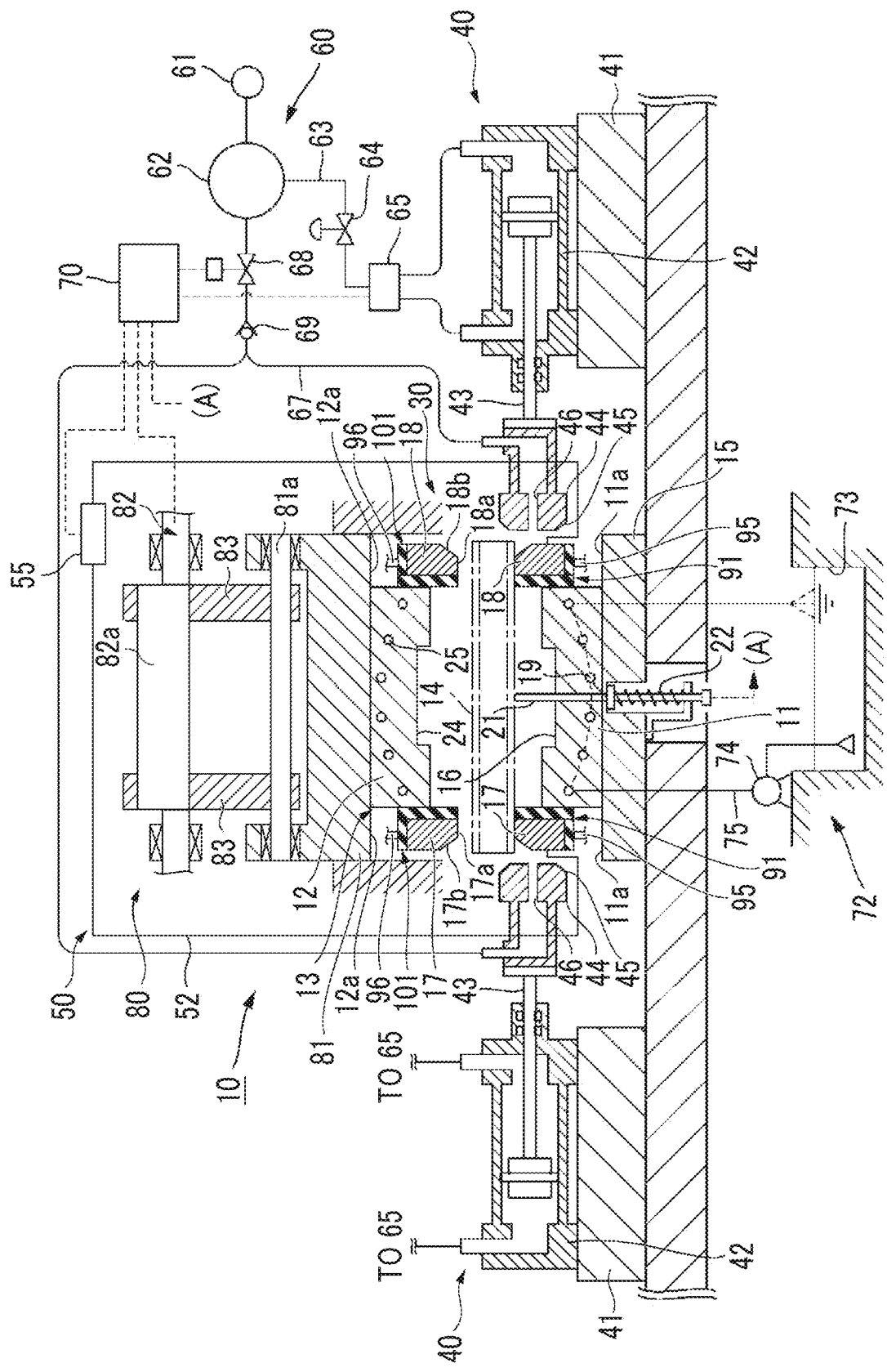
FIG. 1 is a schematic configuration view showing a forming device according to an embodiment of the present invention.

The metal pipe with a flange that is formed by means of the forming device as described above is welded to another member at the flange portion. In this case, welding may be performed with the flange portion being pressed against the other member. In this case, an increase in pressure necessary for the welding may cause a problem such as wear of an electrode and it may become difficult to perform the welding while applying pressure.

It is desirable to provide a forming device and a metal pipe with which it is possible to easily perform welding in a case where welding is to be performed with a flange portion being pressed against another member.

In the forming device according to the embodiment of the present invention, on at least one of the flange forming surface of the first die and the flange forming surface of the second die, the protrusion portion that protrudes by the amount not to abut against the other flange forming surface when the dies are closed is formed. In addition, the controller controls the drive unit such that the thin wall portion at which the thickness of the flange portion becomes partially small is formed at the flange portion by the protrusion portion pressing the flange portion. According to such a configuration, the thin wall portion is formed at the flange portion of the metal pipe since the flange portion is pressed by the protrusion portion of the flange forming surface. The thin wall portion is a portion of the flange portion at which the thickness of the flange portion becomes partially small. Therefore, it is possible to decrease a pressure required for welding by performing welding at the thin wall portion, of which the thickness is small, when welding the flange portion to another member. Accordingly, it is possible to easily perform welding in a case where welding is to be performed with the flange portion being pressed against another member.

In the forming device, the protrusion portion may be intermittently formed at the flange forming surface along a longitudinal direction of the flange forming surface. Accordingly, it is possible to decrease a pressure at the time of a pressing operation with respect to the flange portion with the thickness of a portion of the flange portion in the longitudinal direction, at which welding is performed, made small and the thickness of the other portion thereof made not small.

In the forming device, the first die and the second die may include contact portions that come into contact with each other when the dies are closed and the protrusion portion may be formed inward of the contact portions in a width direction. The contact portions are portions that define tips of the flange portion. Therefore, with the protrusion portion formed inward of the contact portions in the width direction, the protrusion portion can press a position on the flange portion close to the center in the width direction. Accordingly, welding is easily performed at the time of welding of the flange portion.

According to the metal pipe in another embodiment of the present invention, it is possible to obtain operations and effects similar to those of the above-described forming device.

Hereinafter, preferred embodiments of a forming device according to the present invention will be described with reference to the drawings. In addition, in each drawing, the same reference numerals are assigned to the same portions or the corresponding portions, and repeated descriptions thereof are omitted.

Configuration of Forming Device

FIG. 1 is a schematic configuration view of a forming device according to the present embodiment. As shown in FIG. 1, a forming device 10 for forming a metal pipe includes a forming die 13 including an upper die (a first die) 12 and a lower die (a second die) 11, a drive mechanism (a drive unit) 80 which moves at least one of the upper die 12 and the lower die 11, a pipe holding mechanism 30 which holds a metal pipe material 14 disposed between the upper die 12 and the lower die 11, a heating mechanism 50 which electrically heats the metal pipe material 14 held by the pipe holding mechanism 30, a gas supply unit 60 which supplies a high-pressure gas (a gas) into the metal pipe material 14 which is held between the upper die 12 and the lower die 11 and is heated, a pair of gas supply mechanisms 40 and 40 for supplying the gas from the gas supply unit 60 into the metal pipe material 14 held by the pipe holding mechanism 30, and a water circulation mechanism 72 which forcibly water-cools the forming die 13 and the forming device 10 is configured to include a controller 70 which controls driving of the drive mechanism. 80, driving of the pipe holding mechanism 30, driving of the heating mechanism 50, and gas supply of the gas supply unit 60.

The lower die 11, which is one part of the forming die 13, is fixed to a base 15. The lower die 11 is composed of a large steel block and includes a rectangular cavity (a recessed portion) 16 on an upper surface of the lower die 11, for example. A cooling water passage 19 is formed in the lower die 11, and the lower die 11 includes a thermocouple 21 which is inserted from below at an approximately center. The thermocouple 21 is supported to be movable upward or downward by a spring 22.

Furthermore, spaces 11a are provided near right and left ends (right and left ends in FIG. 1) of the lower die 11 and electrodes 17 and 18 (lower electrodes or like), which are movable portions of the pipe holding mechanism 30 and will be described later, are disposed in the spaces 11a to be movable forward or rearward vertically. In addition, the metal pipe material 14 is placed on the lower electrodes 17 and 18 and the lower electrodes 17 and 18 come into contact with the metal pipe material 14 disposed between the upper die 12 and the lower die 11. As a result, the lower electrodes 17 and 18 are electrically connected to the metal pipe material 14.

Insulating materials 91 for preventing energization are provided between the lower die 11 and the lower electrode 17, under the lower electrode 17, between the lower die 11 and the lower electrode 18, and under the lower electrode 18. Each insulating material 91 is fixed to an advancing and retreating rod 95, which is a movable portion of an actuator (not shown) constituting the pipe holding mechanism 30. The actuator is for moving the lower electrodes 17 and 18 or the like upward or downward and a fixed portion of the actuator is held on the base 15 side together with the lower die 11.

The upper die 12, which is the other part of the forming die 13, is fixed to a slide 81 (which will be described later) constituting the drive mechanism 80. The upper die 12 is composed of a large steel block, a cooling water passage 25 is formed in the upper die 12, and the upper die 12 includes a rectangular cavity (a recessed portion) 24 on a lower surface of the upper die 12, for example. The cavity 24 is provided at a position facing the cavity 16 of the lower die 11.

As with the lower die 11, spaces 12a are provided near right and left ends (right and left ends in FIG. 1) of the upper die 12 and electrodes 17 and 18 (upper electrodes or like), which are movable portions of the pipe holding mechanism 30 and will be described later, are disposed in the spaces 12a to be movable forward or rearward vertically. In addition, in a state where the metal pipe material 14 is placed on the lower electrodes 17 and 18, the upper electrodes 17 and 18 move downward to come into contact with the metal pipe material 14 disposed between the upper die 12 and the lower die 11. As a result, the upper electrodes 17 and 18 are electrically connected to the metal pipe material 14.

Insulating materials 101 for preventing energization are provided between the upper die 12 and the upper electrode 17, on the upper electrode 17, between the upper die 12 and the upper electrode 18, and on the upper electrode 18. Each insulating material 101 is fixed to an advancing and retreating rod 96, which is a movable portion of an actuator constituting the pipe holding mechanism 30. The actuator is for moving the upper electrodes 17 and 18 or the like upward or downward and a fixed portion of the actuator is held on the slide 81 side of the drive mechanism 80 together with the upper die 12.

At a right part of the pipe holding mechanism 30, a semi-arc-shaped concave groove 18a corresponding to an outer peripheral surface of the metal pipe material 14 is formed (refer to FIGS. 2A to 2C) on each of surfaces of the electrodes 18 and 18 that face each other and the metal pipe material 14 can be placed so as to be exactly fitted into portions of the concave grooves 18a. At the right part of the pipe holding mechanism 30, as with the concave grooves 18a, a semi-arc-shaped concave groove corresponding to the outer peripheral surface of the metal pipe material 14 is formed on each of exposed surfaces of the insulating materials 91 and 101 that face each other. In addition, front surfaces (surfaces facing the outside of the die) of the electrodes 18 are formed with tapered concave surfaces 18b which are recessed with peripheries thereof inclined to form a shape tapered toward the concave grooves 18a. Accordingly, if the metal pipe material 14 is clamped from above and below at the right part of the pipe holding mechanism 30, the electrodes 18 can exactly surround the outer periphery of a right end portion of the metal pipe material 14 so as to come into close contact with the entire circumference of the right end portion of the metal pipe material 14.

At a left part of the pipe holding mechanism 30, a semi-arc-shaped concave groove 17a corresponding to the outer peripheral surface of the metal pipe material 14 is formed (refer to FIGS. 2A to 2C) on each of surfaces of the electrodes 17 and 17 that face each other and the metal pipe material 14 can be placed so as to be exactly fitted into portions of the concave grooves 17a. At the left part of the pipe holding mechanism 30, as with the concave grooves 18a, a semi-arc-shaped concave groove corresponding to the outer peripheral surface of the metal pipe material 14 is formed on each of exposed surfaces of the insulating materials 91 and 101 that face each other. In addition, front surfaces (surfaces facing the outside of the die) of the electrodes 17 are formed with tapered concave surfaces 17*b* which are recessed with peripheries thereof inclined to forma shape tapered toward the concave grooves 17*a*. Accordingly, if the metal pipe material 14 is clamped from above and below at the left part of the pipe holding mechanism 30, the electrodes 17 can exactly surround the outer periphery of a left end portion of the metal pipe material 14 so as to come into close contact with the entire circumference of the left end portion of the metal pipe material 14.

As shown in FIG. 1, the drive mechanism 80 includes the slide 81 which moves the upper die 12 such that the upper die 12 and the lower die 11 are joined to each other, a shaft 82 which generates a driving force for moving the slide 81, and a connecting rod 83 for transmitting the driving force generated by the shaft 82 to the slide 81. The shaft 82 extends in a lateral direction above the slide 81, is supported to be rotatable, and includes an eccentric crank 82*a* which protrudes from right and left ends at a position separated from the axis of the shaft 82 and extends in the lateral direction. The eccentric crank 82*a* and a rotary shaft 81*a* which is provided above the slide 81 and extends in the lateral direction are connected to each other by the connecting rod 83. In the case of the drive mechanism 80, the upward and downward movement of the slide 81 can be controlled by the controller 70 controlling rotation of the shaft 82 such that the height of the eccentric crank 82*a* in a vertical direction is changed and the positional change of the eccentric crank 82*a* is transmitted to the slide 81 via the connecting rod 83. Here, oscillation (a rotary motion) of the connecting rod 83 generated when the positional change of the eccentric crank 82*a* is transmitted to the slide 81 is absorbed by the rotary shaft 81*a*. Note that, the shaft 82 is rotated or stopped in accordance with the driving of a motor or the like controlled by the controller 70, for example.

FIGS. 3A to 3D are sectional views of the forming die 13 shown in FIG. 1. As shown in FIGS. 3A to 3D, steps are provided on both the upper surface of the lower die 11 and the lower surface of the upper die 12.

If a bottom surface of the center cavity 16 of the lower die 11 is defined as a reference line LV2, the step is formed on the upper surface of the lower die 11 by a first protrusion 11*b*, a second protrusion 11*c*, a third protrusion 11*d*, and a fourth protrusion 11*e*. The first protrusion 11*b* and the second protrusion 11*c* are formed on a right side (right side in FIGS. 3A to 3D and a rear side of a paper surface in FIG. 1) of the cavity 16, and the third protrusion 11*d* and the fourth protrusion 11*e* are formed on a left side (left side in FIGS. 3A to 3D and a front side of the paper surface in FIG. 1) of the cavity 16. The second protrusion 11*c* is located between the cavity 16 and the first protrusion 11*b*. The third protrusion 11*d* is located between the cavity 16 and the fourth protrusion 11*e*. The second protrusion 11*c* and the third protrusion 11*d* respectively protrude toward the upper die 12 side from the first protrusion 11*b* and the fourth protrusion 11*e*. Protrusion amounts of the first protrusion 11*b* and the fourth protrusion 11*e* from the reference line LV2 are approximately the same as each other, and protrusion amounts of the second protrusion 11*c* and the third protrusion 11*d* from the reference line LV2 are approximately the same as each other.

Meanwhile, if a bottom surface of the center cavity 24 of the upper die 12 is defined as a reference line LV1, the step is formed on the lower surface of the upper die 12 by a first protrusion 12*b*, a second protrusion 12*c*, a third protrusion 12*d*, and a fourth protrusion 12*e*. The first protrusion 12*b* and the second protrusion 12*c* are formed on a right side (a right side in FIGS. 3A to 3D) of the cavity 24, and the third protrusion 12*d* and the fourth protrusion 12*e* are formed on a left side (a left side in FIGS. 3A to 3D) of the cavity 24. The second protrusion 12*c* is located between the cavity 24 and the first protrusion 12*b*. The third protrusion 12*d* is located between the cavity 24 and the fourth protrusion 12*e*. The first protrusion 12*b* and the fourth protrusion 12*e* respectively protrude toward the lower die 11 side from the second protrusion 12*c* and the third protrusion 12*d*. Protrusion amounts of the first protrusion 12*b* and the fourth protrusion 12*e* from the reference line LV1 are approximately the same as each other, and protrusion amounts of the second protrusion 12*c* and the third protrusion 12*d* from the reference line LV1 are approximately the same as each other.

In addition, the first protrusion 12*b* of the upper die 12 faces the first protrusion 11*b* of the lower die 11, the second protrusion 12*c* of the upper die 12 faces the second protrusion 11*c* of the lower die 11, the cavity 24 of the upper die 12 faces the cavity 16 of the lower die 11, the third protrusion 12*d* of the upper die 12 faces the third protrusion 11*d* of the lower die 11, and the fourth protrusion 12*e* of the upper die 12 faces the fourth protrusion 11*e* of the lower die 11. In addition, a protrusion amount (a protrusion amount of the fourth protrusion 12*e* with respect to the third protrusion 12*d*) of the first protrusion 12*b* with respect to the second protrusion 12*c* in the upper die 12 is larger than a protrusion amount (a protrusion amount of the third protrusion 11*d* with respect to the fourth protrusion 11*e*) of the second protrusion 11*c* with respect to the first protrusion 11*b* in the lower die 11. Accordingly, when the upper die 12 and the lower die 11 are fitted to each other, spaces are respectively formed between the second protrusion 12*c* of the upper die 12 and the second protrusion 11*c* of the lower die 11 and between the third protrusion 12*d* of the upper die 12 and the third protrusion 11*d* of the lower die 11 (refer to FIG. 3C). In addition, when the upper die 12 and the lower die 11 are fitted to each other, a space is formed between the cavity 24 of the upper die 12 and the cavity 16 of the lower die 11 (refer to FIG. 3C).

Figure 3A:
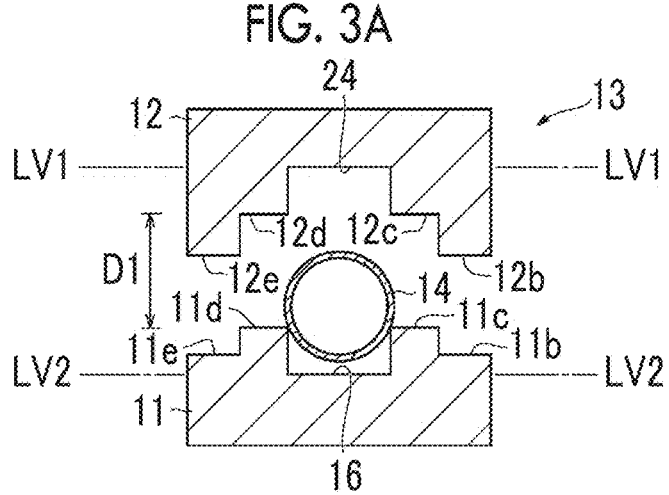
FIGS. 3A to 3D are sectional views of a forming die.
Figure 3B:
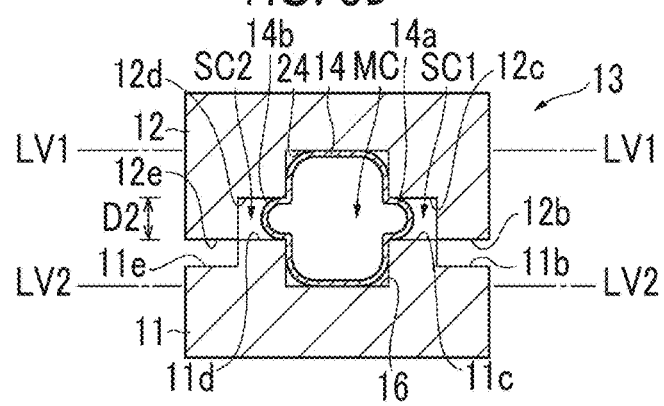
Figure 3C:
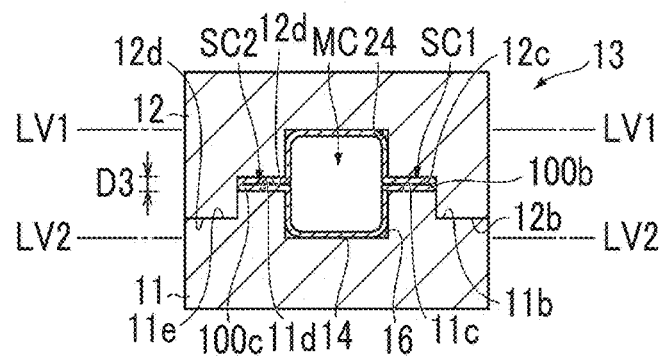
Figure 3D:
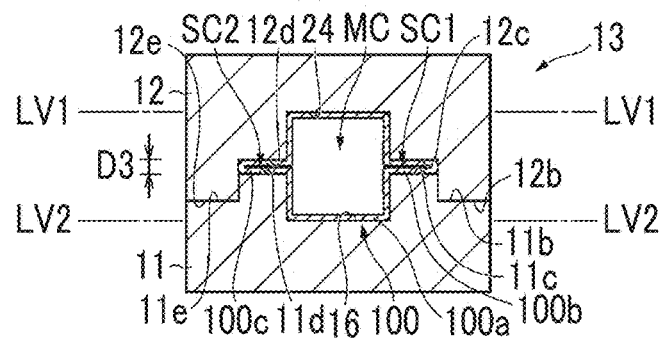

More specifically, when blow forming is performed, at a time before the lower die 11 and the upper die 12 are joined and fitted to each other, as shown in FIG. 3B, a main cavity portion (first cavity portion) MC is formed between a bottom surface (a surface becoming the reference line LV1) of the cavity 24 of the upper die 12 and a bottom surface (a surface becoming the reference line LV2) of the cavity 16 of the lower die 11. In addition, a sub cavity portion (second cavity portion) SC1 which communicates with the main cavity portion MC and has a volume smaller than that of the main cavity portion MC is formed between the second protrusion 12*c* of the upper die 12 and the second protrusion 11*c* of the lower die 11. Similarly, a sub cavity portion (second cavity portion) SC2 which communicates with the main cavity portion MC and has a volume smaller than that of the main cavity portion MC is formed between the third protrusion 12*d* of the upper die 12 and the third protrusion 11*d* of the lower die 11. The main cavity portion MC is a portion which forms a pipe portion 100*a* in the metal pipe 100 and the sub cavity portions SC1 and SC2 are portions which respectively form flange portions 100*b* and 100*c* in the metal pipe 100 (refer to FIGS. 3C and 3D). In addition, as shown in FIGS. 3C and 3D, in a case where the lower die 11 and the upper die 12 are joined (fitted) to each other so as to be completely closed, the main cavity portion MC and the sub cavity portions SC1 and SC2 are sealed in the lower die 11 and the upper die 12.

As shown in FIG. 1, the heating mechanism 50 includes a power supply unit 55 and a busbar 52 which electrically connects the power supply unit 55 and the electrodes 17 and 18 to each other. The power supply unit 55 includes a DC power source and a switch and can energize the metal pipe material 14 via the busbar 52 and the electrodes 17 and 18 in a state where the electrodes 17 and 18 are electrically connected to the metal pipe material 14. Note that, here, the busbar 52 is connected to the lower electrodes 17 and 18.

In the heating mechanism 50, a DC current output from the power supply unit 55 is transmitted via the busbar 52 and input to the electrodes 17. Then, the DC current passes through the metal pipe material 14 and is input to the electrodes 18. Then, the DC current is transmitted via the busbar 52 and input to the power supply unit 55.

Figure 2A:
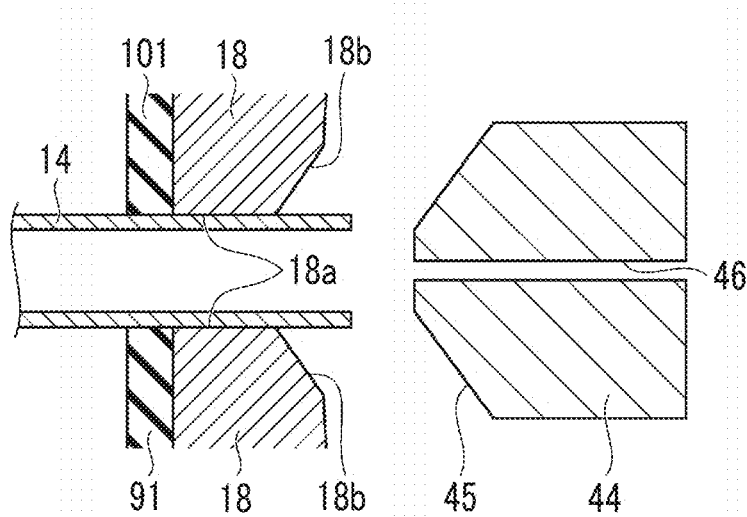
FIGS. 2A to 2C are enlarged views of a periphery of an electrode.
Figure 2B:
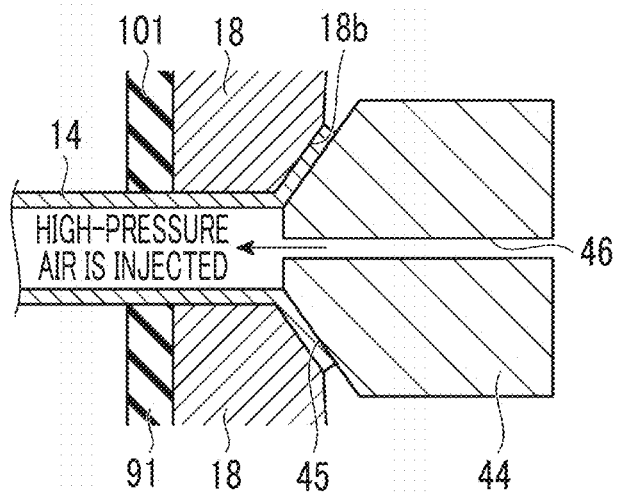
Figure 2C:
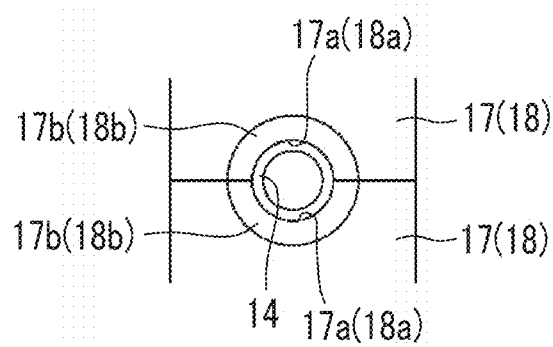

Each of the pair of gas supply mechanisms 40 includes a cylinder unit 42, a cylinder rod 43 which moves forward and rearward in accordance with an operation of the cylinder unit 42, and a seal member 44 connected to a tip of the cylinder rod 43 on the pipe holding mechanism 30 side. The cylinder unit 42 is placed on and fixed to a block 41. A tapered surface 45 is formed at a tip of each seal member 44 so that the tip is tapered and the tip is configured to have a shape matching the tapered concave surfaces 17b and 18b of the electrodes 17 and 18 (refer to FIGS. 2A to 2C). Each seal member 44 is provided with a gas passage 46 which extends toward the tip from the cylinder unit 42 side. More specifically, as shown in FIGS. 2A and 2B, a high-pressure gas supplied form the gas supply unit 60 flows through the gas passage 46.

The gas supply unit 60 includes a gas source 61, an accumulator 62 in which the gas supplied by the gas source 61 is stored, a first tube 63 which extends from the accumulator 62 to the cylinder unit 42 of the gas supply mechanism 40, a pressure control valve 64 and a switching valve 65 which are interposed in the first tube 63, a second tube 67 which extends from the accumulator 62 to the gas passage 46 formed in the seal member 44, and a pressure control valve 68 and a check valve 69 which are interposed in the second tube 67. The pressure control valve 64 plays a role of supplying gas of an operation pressure adapted to a pressing force of the seal member 44 with respect to the metal pipe material 14 to the cylinder unit 42. The check valve 69 plays a role of preventing a high-pressure gas from back-flowing in the second tube 67. The pressure control valve 68 interposed in the second tube 67 plays a role of supplying a gas of an operation pressure for expanding the metal pipe material 14 to the gas passage 46 of the seal member 44 by being controlled by the controller 70.

The controller 70 can control the pressure control valve 68 of the gas supply unit 60 such that a gas of a desired operation pressure is supplied into the metal pipe material 14. In addition, with information transmitted to the controller 70 from (A) shown in FIG. 1, the controller 70 acquires temperature information from the thermocouple 21 and controls the drive mechanism 80, the power supply unit 55, and the like.

The water circulation mechanism 72 includes a water tank 73 which stores water, a water pump 74 which pumps up the water stored in the water tank 73, pressurizes the water, and sends the water to the cooling water passage 19 of the lower die 11 and the cooling water passage 25 of the upper die 12, and a pipe 75. Although omitted, a cooling tower for lowering a water temperature and a filter for purifying the water may be interposed in the pipe 75.

Forming Method of Metal Pipe Using Forming Device

Next, a forming method of the metal pipe using the forming device 10 will be described. First, the quenchable steel type cylindrical metal pipe material 14 is prepared. For example, the metal pipe material 14 is placed on (inserted) the electrodes 17 and 18 provided on the lower die 11 side by means of a robot arm or the like. Since the concave grooves 17a and 18a are formed on the electrodes 17 and 18, the metal pipe material 14 is located by the concave grooves 17a and 18a.

Next, the controller 70 controls the drive mechanism 80 and the pipe holding mechanism 30 such that the metal pipe material 14 is held by the pipe holding mechanism 30. Specifically, the drive mechanism 80 is driven such that the upper die 12 held on the slide 81 side and the upper electrodes 17 and 18 are moved to the lower die 11 side and the actuator that can move the upper electrodes 17 and 18 and the lower electrodes 17 and 18 included in the pipe holding mechanism 30 forward and rearward is operated such that peripheries of the both end portions of the metal pipe material 14 are clamped from above and below by the pipe holding mechanism 30. The clamping is performed in an aspect in which the concave grooves 17a and 18a formed on the electrodes 17 and 18 and the concave grooves formed on the insulating materials 91 and 101 are provided such that the electrodes 17 and 18 come into close contact with the vicinity of each of the both end portions of the metal pipe material 14 over the entire circumference.

Note that, in this case, as shown in FIG. 2A, an end portion of the metal pipe material 14 that is on the electrode 18 side protrudes toward the seal member 44 side beyond a boundary between the concave grooves 18a of the electrodes 18 and the tapered concave surfaces 18b in a direction in which the metal pipe material 14 extends. Similarly, an end portion of the metal pipe material 14 that is on the electrode 17 side protrudes toward the seal member 44 side beyond a boundary between the concave grooves 17a of the electrodes 17 and the tapered concave surfaces 17b in the direction in which the metal pipe material 14 extends. In addition, lower surfaces of the upper electrodes 17 and 18 and upper surfaces of the lower electrodes 17 and 18 are in contact with each other. However, the present invention is not limited to a configuration in which the electrodes 17 and 18 come into close contact with the entire circumferences of the both end portions of the metal pipe material 14. That is, the electrodes 17 and 18 may abut against a portion of the metal pipe material 14 in a circumferential direction.

Next, the controller 70 controls the heating mechanism 50 so as to heat the metal pipe material 14. Specifically, the controller 70 controls the power supply unit 55 of the heating mechanism 50 such that power is supplied. As a result, power transmitted to the lower electrodes 17 and 18 via the busbar 52 is supplied to the upper electrodes 17 and 18 clamping the metal pipe material 14 and the metal pipe material 14 and the metal pipe material 14 generates heat due to Joule heat caused by the resistance of the metal pipe material 14. That is, the metal pipe material 14 enters an electrically heated state.

Next, the controller 70 controls the drive mechanism 80 such that the forming die 13 is closed with respect to the heated metal pipe material 14. Accordingly, the cavity 16 of the lower die 11 and the cavity 24 of the upper die 12 are combined with each other such that the metal pipe material 14 is disposed in a cavity portion between the lower die 11 and the upper die 12 and is sealed.

Thereafter, the cylinder unit 42 of the gas supply mechanism 40 is operated such that both ends of the metal pipe material 14 are sealed with the seal members 44 moving forward. In this case, as shown in FIG. 2B, the seal member 44 is pressed against the end portion of the metal pipe material 14 that is on the electrode 18 side and thus a portion of the metal pipe material 14 that protrudes toward the seal member 44 side beyond the boundary between the concave grooves 18a of the electrodes 18 and the tapered concave surfaces 18b is deformed into a funnel shape to match the tapered concave surfaces 18b. Similarly, the seal member 44 is pressed against the end portion of the metal pipe material 14 that is on the electrode 17 side and thus a portion of the metal pipe material 14 that protrudes toward the seal member 44 side beyond the boundary between the concave grooves 17a of the electrodes 17 and the tapered concave surfaces 17b is deformed into a funnel shape to match the tapered concave surfaces 17b. After the sealing is finished, a high-pressure gas is blown into the metal pipe material 14 and the heated and softened metal pipe material 14 is formed in accordance with the shape of the cavity portion.

The metal pipe material 14 is heated to a high temperature (approximately 950° C.) and softened and thus the gas supplied into the metal pipe material 14 thermally expands. Accordingly, for example, compressed air may be used as the gas to be supplied such that the metal pipe material 14 of 950° C. is easily expanded by compressed air thermally expanded.

An outer peripheral surface of the blow-formed and expanded metal pipe material 14 comes into contact with the cavity 16 of the lower die 11 so as to be rapidly cooled and comes into contact with the cavity 24 of the upper die 12 so as to be rapidly cooled (the upper die 12 and the lower die 11 have a large heat capacity and are controlled to a low temperature, and thus, if the metal pipe material 14 comes into contact with the upper die 12 and the lower die 11, a heat of a pipe surface is taken to the die side at once) at the same time so that quenching is performed. The above-described cooling method is referred to as die contact cooling or die cooling. Immediately after being rapidly cooled, austenite transforms into martensite (hereinafter, transformation from austenite to martensite is referred to as martensitic transformation). The cooling rate is made low in a second half of the cooling, and thus, martensite transforms into another structure (such as troostite, sorbite, or the like) due to recuperation. Therefore, it is not necessary to separately perform tempering treatment. In addition, in the present embodiment, the cooling may be performed by supplying a cooling medium into, for example, the cavity 24, instead of or in addition to the cooling of the die. For example, cooling may be performed by bring the metal pipe material 14 into contact with the dies (the upper die 12 and the lower die 11) until a temperature at which the martensitic transformation starts is reached and the dies may be opened thereafter with a cooling medium (cooling gas) blown onto the metal pipe material 14 such that martensitic transformation occurs.

A metal pipe having an approximately rectangular main body portion is obtained when cooling is performed and dies are opened after blow forming is performed with respect to the metal pipe material 14 as described above, for example.

Figure 4:
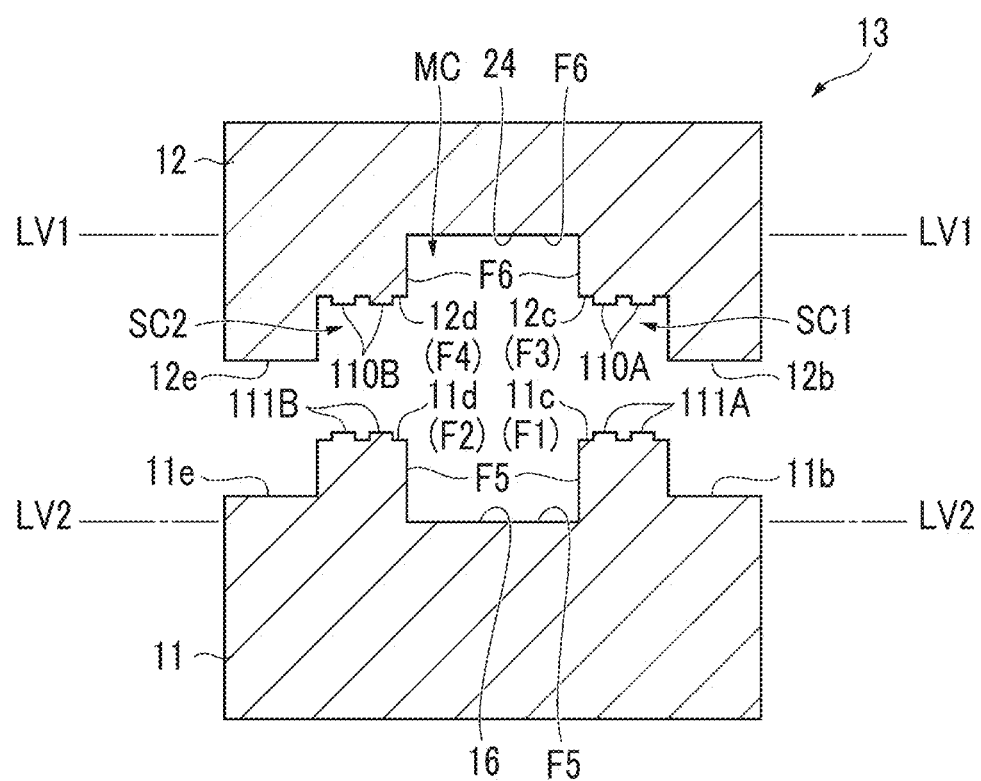
FIG. 4 is an enlarged sectional view of the forming die.
Figure 5A:
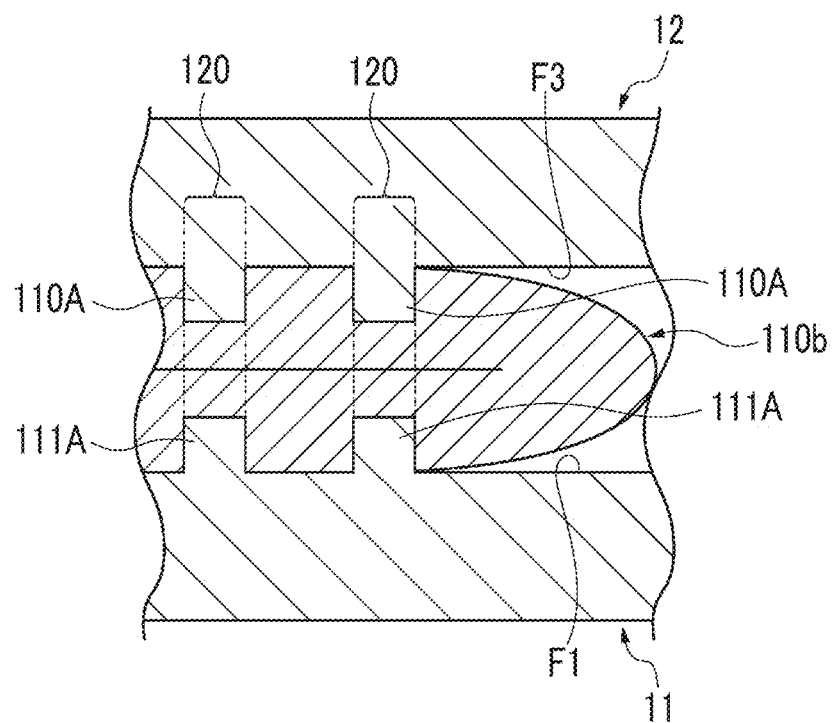
FIGS. 5A and 5B are enlarged sectional views of a flange portion and flange forming surfaces.
Figure 5B:
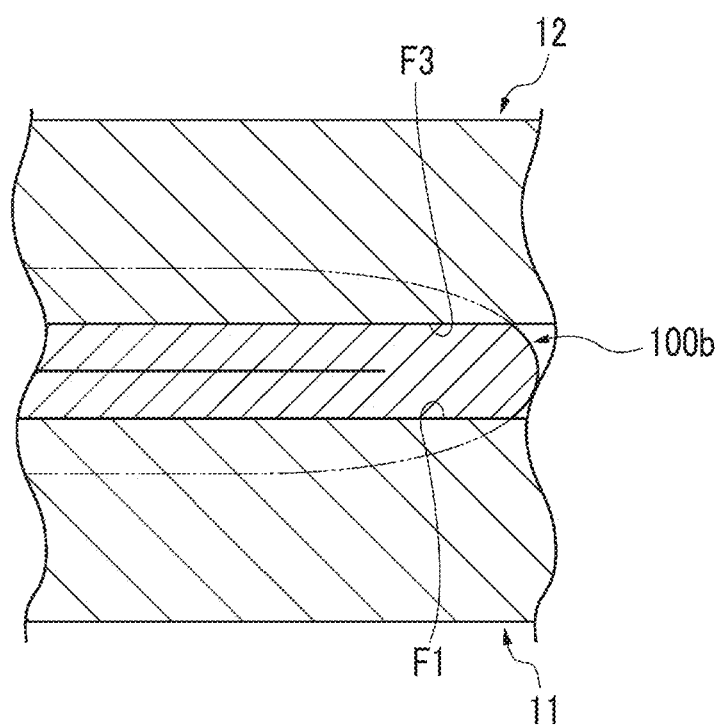
Figure 6A:
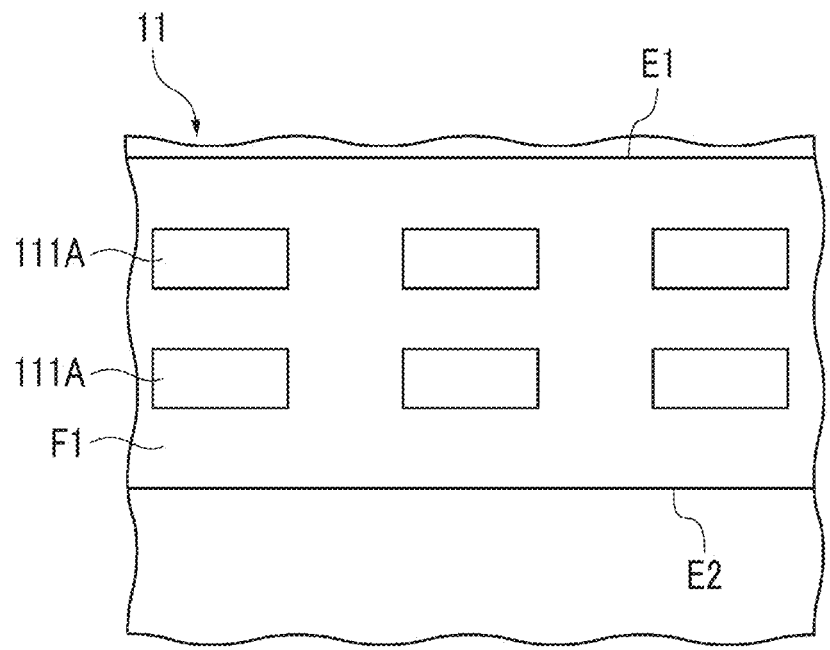
FIG. 6A is a view of the flange forming surface as seen from above and FIG. 6B is a view of a metal pipe as seen from above.
Figure 6B:
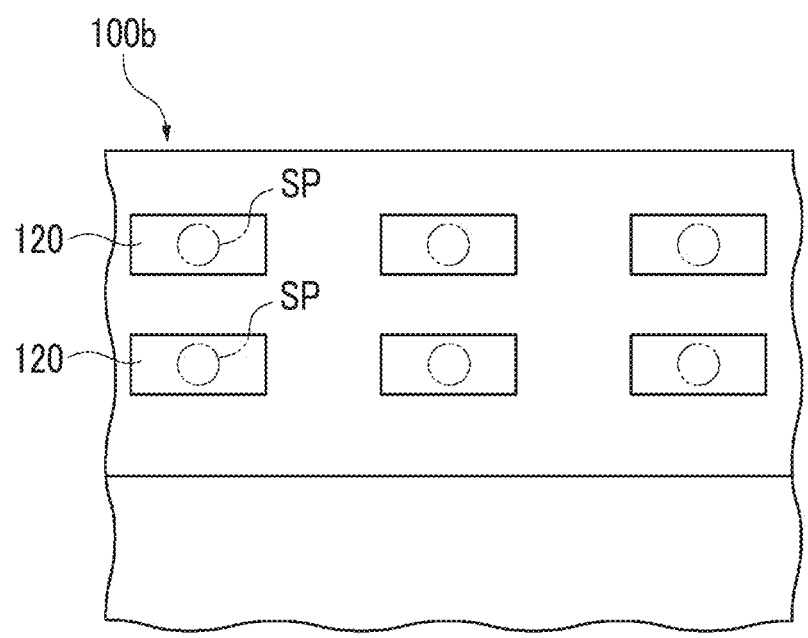

Here, the forming device 10 has a structure making the thicknesses of the flange portions 100b and 100c partially small. The configuration of the structure will be described with reference to FIGS. 4 to 6B. FIG. 4 is an enlarged sectional view of the forming die 13. FIGS. 5A and 5B are enlarged sectional views of the flange portion 100b at the time of the closing of the dies. FIG. 6A is a view of a flange forming surface as seen from above. FIG. 6B is a view of the flange portion 100b as seen from above. Note that, in FIG. 4, the upper die 12 and the lower die 11 are in an opened state. Accordingly, strictly speaking, the main cavity portion MC and the sub cavity portions SC1 and SC2 are not formed. However, for the sake of explanation, portions corresponding to a die shape for forming the cavity portions will be given symbols "MC", "SC1", and "SC2".

As shown in FIG. 4, the lower die 11 and the upper die 12 include flange forming surfaces F1 and F3 for forming the flange portion 100b. The flange forming surfaces F1 and F3 face each other and are surfaces which constitute the sub cavity portion SC1. The lower die 11 and the upper die 12 include flange forming surfaces F2 and F4 for forming the flange portion 100c. The flange forming surfaces F2 and F4 face each other and are surfaces which constitute the sub cavity portion SC2. The lower die 11 and the upper die 12 include pipe forming surfaces F5 and F6 for forming the pipe portion 100a. The pipe forming surfaces F5 and F6 are surfaces that constitute the main cavity portion MC.

Protrusion portions 111A and 111B are formed on the flange forming surfaces F1 and F2 of the sub cavity portions SC1 and SC2 of the lower die 11, respectively. The protrusion portions 111A and 111B are portions which protrude toward the flange forming surfaces F3 and F4 from the flange forming surfaces F1 and F2. Here, the flange forming surface F1 of the sub cavity portion SC1 of the lower die 11 corresponds to an upper surface of the second protrusion 11c. The flange forming surface F2 of the sub cavity portion SC2 of the lower die 11 corresponds to an upper surface of the third protrusion 11d. Surfaces of the protrusion portions 111A and 111B also correspond to the flange forming surfaces F1 and F2. In addition, protrusion portions 110A and 110B are formed on the flange forming surfaces F3 and F4 of the sub cavity portions SC1 and SC2 of the upper die 12, respectively. The protrusion portions 110A and 110B are portions which protrude toward the flange forming surfaces F1 and F2 from the flange forming surfaces F3 and F4. Here, the flange forming surface F3 of the sub cavity portion SC1 of the upper die 12 corresponds to a lower surface of the second protrusion 12c. The flange forming surface F4 of the sub cavity portion SC2 of the upper die 12 corresponds to an upper surface of the fourth protrusion 12e. Note that, surfaces of the protrusion portions 110A and 110B also correspond to the flange forming surfaces F3 and F4. The pipe forming surfaces F5 correspond to a bottom surface and both side surfaces of the cavity 16. The pipe forming surfaces F6 correspond to a bottom surface and both side surfaces of the cavity 24.

An upper surface of the first protrusion 11b of the lower die 11 and a lower surface of the first protrusion 12b of the upper die 12 come into contact with each other when the dies are closed. Accordingly, the first protrusion 11b and the first protrusion 12b correspond to contact portions that come into contact with each other when the dies are closed. The protrusion portions 111A and 110A are formed inward (leftward in the paper surface of FIG. 4) of the first protrusions 11b and 12b, which are the contact portions, in a width direction. An upper surface of the fourth protrusion 11e of the lower die 11 and a lower surface of the fourth protrusion 12e of the upper die 12 come into contact with each other when the dies are closed. Accordingly, the fourth protrusion 11e and the fourth protrusion 12e correspond to contact portions that come into contact with each other when the dies are closed. The protrusion portions 111B and 110B are formed inward (rightward in the paper surface of FIG. 4) of the fourth protrusions 11e and 12e, which are the contact portions, in the width direction.

Each of upper surfaces of the protrusion portions 111A and 111B is composed of a flat surface which is disposed at a position higher than those of the flange forming surfaces F1 and F2. However, the shape of each of the upper surfaces of the protrusion portions 111A and 111B is not particularly limited and each of the upper surfaces may be a curved surface or the like. Each of lower surfaces of the protrusion portions 110A and 110B is composed of a flat surface which is disposed at a position lower than those of the flange forming surfaces F3 and F4. However, the shape of each of the lower surfaces of the protrusion portions 110A and 110B is not particularly limited and each of the lower surfaces may be a curved surface or the like. In addition, protrusion amounts of the protrusion portions 110A, 110B, 111A, and 111B are not particularly limited and are set such that any of the protrusion portions 110A, 110B, 111A, and 111B does not abut onto the other flange forming surface when the dies are closed (refer to FIG. 5A). Note that, the protrusion portions 110A and 110B are integrally formed with the upper die 12, and the protrusion portions 111A and 111B are integrally formed with the lower die 11. However, only the protrusion portions 110A, 110B, 111A, and 111B may be formed separately from the dies. In addition, only at least one of the protrusion portions 111A and 111B may be formed. Only at least one of the protrusion portions 110A and 110B may be formed.

Next, a state where the protrusion portions 111A are viewed from above will be described with reference to FIG. 6A. Note that, the other protrusion portions 111B, 110A, and 110B also have the same configuration. As shown in FIG. 6A, the protrusion portions 111A are formed inward of an outer end portion E1 of the flange forming surface F1. In addition, the protrusion portions 111A are formed inward of an inner end portion E2 of the flange forming surface F1. The protrusion portions 111A are arranged in two rows to be separated from each other in the width direction. Moreover, the size of each protrusion portion 111A in the width direction is not particularly limited. However, it is preferable that the size in the width direction is approximately 10 to 50% of that of the flange forming surface such that the flange portion can be pressed locally. In addition, the positions of the protrusion portions 111A in the width direction of the flange forming surface F1 are not particularly limited.

The protrusion portions 111A are intermittently formed at the flange forming surface F1 along a longitudinal direction (that is, a direction in which the metal pipe extends) of the flange forming surface F1. Therefore, a gap is formed between one protrusion portion 111A and another protrusion portion 111A in the longitudinal direction. Note that, there is no particular limitation on how much size is to be secured for the gap. In the aspect shown in FIG. 6A, each protrusion portion 111A has a rectangular shape. However, the shape of each protrusion portion 111A is not particularly limited.

Since the protrusion portions 111A and 110A as described above are provided, the metal pipe 100 having the flange portion 100b as shown in FIG. 5A and FIG. 6B is formed. The flange portion 100b includes thin wall portions 120 at which the thickness of the flange portion 100b becomes partially small. The thicknesses of the thin wall portions 120 are smaller than the thickness of a portion of the flange portion 100b excluding the thin wall portions 120. The thin wall portions 120 are formed at positions where welded portions SP may be formed through spot welding at the time of attachment of the metal pipe 100 to another member. The thin wall portions 120 are formed at portions of the flange portion 100b that are pressed by the protrusion portions 111A and 110A from above and below in a clamping manner. That is, the thin wall portions 120 are formed between recessed portions formed by being pressed by the protrusion portions 111A and recessed portions formed by being pressed by the protrusion portions 110A.

The thin wall portions 120 are intermittently formed at the flange portion 100b along a longitudinal direction (that is, the direction in which the metal pipe extends) of the flange portion 100b. The pitch of the thin wall portions 120 in the longitudinal direction is not particularly limited and can be appropriately set in accordance with the pitch of the welded portions SP. In addition, in a case where the thin wall portions 120 are formed at pitches shorter than the pitch of the welded portions SP, it is possible to select the position of welding at the time of welding. In addition, the thin wall portions 120 are formed at positions separated from both end portions of the flange portion 100b in the width direction. In addition, the thin wall portions 120 are formed in two rows to be separated from each other in the width direction of the flange portion 100b. Accordingly, at the time of welding, the welded portions SP can be formed at two positions in the width direction. Alternatively, positions where the welded portions SP are formed can be selected in the width direction.

Note that, the thicknesses of the thin wall portions 120 are not particularly limited as long as the flange portion 100b is not penetrated. However, the thicknesses of the thin wall portions 120 may be set to about 30 to 70% of the thickness of the other portion of the flange portion 100b so that no excessive pressure is generated at the time of welding and no excessive pressure is generated at the time of formation. In addition, since the flange portion 100b is formed by pressing and crushing the pipe wall of the metal pipe material, the flange portion 100b has a configuration where two pipe walls overlap each other (refer to FIG. 5A). It is preferable that no gap is formed between the two pipe walls. However, it is preferable that the two pipe walls are not excessively pressed and crushed as in FIG. 5B such that no excessive pressure is generated. For example, the thickness of the flange portion 100b may be set to about 30 to 70%, where a thickness corresponding to the two pipe walls before formation is 100%.

The controller 70 controls the drive mechanism 80 such that the thin wall portions 120 at which the thicknesses of the flange portions 100b and 100c become partially small are formed at the flange portions 100b and 100c by the protrusion portions 111A, 111B, 110A, and 110B pressing the flange portions 100b and 100c. In the present embodiment, the first protrusion 11b and the first protrusion 12b come into contact with each other and the fourth protrusion 11e and the fourth protrusion 12e come into contact with each other when the dies are closed. Accordingly, it is sufficient that the controller 70 closes the forming die 13 until the contact portions come into contact with each other. However, in a case where the forming die 13 with no contact portion is used, the drive mechanism 80 is controlled while the thicknesses of the flange portions 100b and 100c and the thin wall portions 120 are adjusted such that no excessive pressure is applied. Note that, the controller 70 includes a processor, a memory, a storage, a communication interface, and a user interface and is composed of a general computer or the like. The processor is an arithmetic unit such as a central processing unit (CPU). The memory is a storage medium such as a read only memory (ROM) or a random access memory (RAM). The storage is a storage medium such as a hard disk drive (HDD). The communication interface is a communication device that realizes data communication. The processor realizes a function of controlling the drive mechanism 80 by integrating the memory, the storage, the communication interface, and the user interface. When controlling the drive mechanism 80, for example, a program stored in the ROM is loaded into the RAM and the program loaded into the RAM is executed by the CPU such that various functions are realized. The controller 70 may be composed of one device or may be configured by combining devices different from each other.

Next, the operations and effects of the forming device 10 and the metal pipe 100 according to the present embodiment will be described.

For example, as a comparative example, there is a configuration in which the flange portions 100*b* and 100*c* are formed by using a forming die that does not include the protrusion portions 111A, 111B, 110A, and 110B as in the present embodiment. In the case of such a forming device, the hardnesses of the flange portions 100*b* and 100*c* become high and the thicknesses thereof become large in a case where the flange portions 100*b* and 100*c* are formed by the forming die through a pressing operation. When such a flange portion is welded while being pressed against another member, there may be problems such as generation of dust, wear of electrodes, uneven welding quality, or the like accompanied by application of an excessive pressure since there is an increase in pressure required for welding and thus it may be difficult to perform the welding while applying pressure. Meanwhile, in a case where the entire flange portions 100*b* and 100*c* are made thin as shown in FIG. 5B to make the thicknesses of the flange portions 100*b* and 100*c* small, a very large pressure is required at the time of a pressing operation.

With regard to this, in the forming device 10 according to the present embodiment, on the flange forming surfaces F1 and F2 of the lower die 11 and the flange forming surfaces F3 and F4 of the upper die 12, the protrusion portions 111A, 111B, 110A, and 110B, each of which protrudes by an amount not to abut against the other flange forming surface when the dies are closed, are formed. In addition, the controller 70 controls the drive mechanism 80 such that the thin wall portions 120 at which the thicknesses of the flange portions 100*b* and 100*c* become partially small are formed at the flange portions 100*b* and 100*c* by the protrusion portions 111A, 111B, 110A, and 110B pressing the flange portions 100*b* and 100*c*. According to such a configuration, the thin wall portions 120 are formed at the flange portions 100*b* and 100*c* of the metal pipe 100 since the flange portions 100*b* and 100*c* are pressed by the protrusion portions 111A, 111B, 110A, and 110B of the flange forming surfaces F1, F2, F3, and F4. The thin wall portions 120 are portions of the flange portions 100*b* and 100*c* at which the thicknesses of the flange portions 100*b* and 100*c* become partially small. Therefore, it is possible to decrease a pressure required for welding by performing welding at the thin wall portions 120, of which the thicknesses are small, when welding the flange portions 100*b* and 100*c* to another member. In addition, with the thin wall portions 120 partially formed, it is possible to decrease a pressure required at the time of a pressing operation in comparison with a case where the entire flange portions 100*b* and 100*c* are made thin (refer to FIG. 5B). Accordingly, it is possible to easily perform welding in a case where welding is to be performed with the flange portions 100*b* and 100*c* being pressed against another member.

In the forming device 10, the protrusion portions 111A, 111B, 110A, and 110B may be intermittently formed at the flange forming surfaces F1, F2, F3, and F4 along the longitudinal direction of the flange forming surfaces F1, F2, F3, and F4. Accordingly, it is possible to decrease a pressure at the time of a pressing operation with respect to the flange portions 100*b* and 100*c* with the thickness of a portion of the flange portions 100*b* and 100*c* in the longitudinal direction, at which welding is performed, made small and the thickness of the other portion thereof made not small.

In the forming device 10, the lower die 11 and the upper die 12 may include contact portions that come into contact with each other when the dies are closed and the protrusion portions 111A, 111B, 110A, and 110B may be formed inward of the contact portions in the width direction. The contact portions are portions that define tips of the flange portions 100*b* and 100*c*. Therefore, with the protrusion portions 111A, 111B, 110A, and 110B formed inward of the contact portions in the width direction, the protrusion portions 111A, 111B, 110A, and 110B can press positions on the flange portions 100*b* and 100*c* close to the center in the width direction. Accordingly, welding is easily performed at the time of welding of the flange portions 100*b* and 100*c*.

The metal pipe 100 according to the present embodiment is the metal pipe 100 including the pipe portion 100*a* and the flange portions 100*b* and 100*c* and the flange portions 100*b* and 100*c* include the thin wall portions 120 at which the thicknesses of the flange portions 100*b* and 100*c* become partially small.

According to the metal pipe 100 in the present embodiment, it is possible to obtain operations and effects similar to those of the above-described forming device 10.

The present invention is not limited to the above-described embodiment. For example, the entire configuration of the forming device is not limited to that shown in FIG. 1 and can be appropriately changed without departing from the spirit of the invention.

Figure 7A:
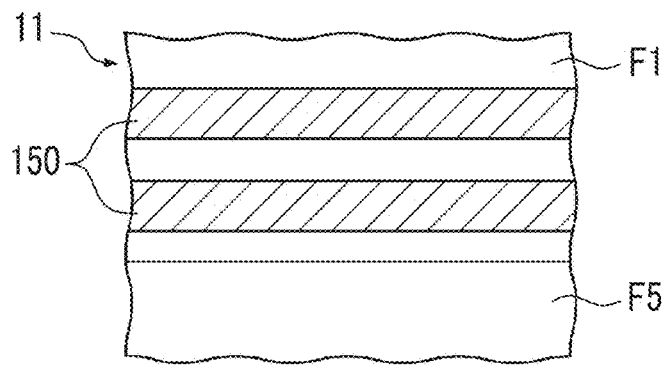
FIGS. 7A to 7D are views showing the shapes of protrusion portions of a forming device according to a modification example.
Figure 7B:
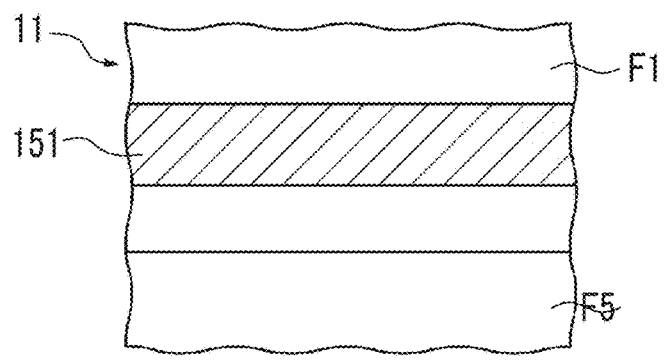
Figure 7C:
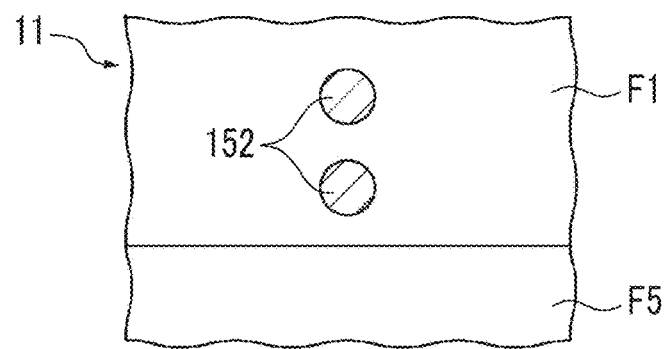
Figure 7D:
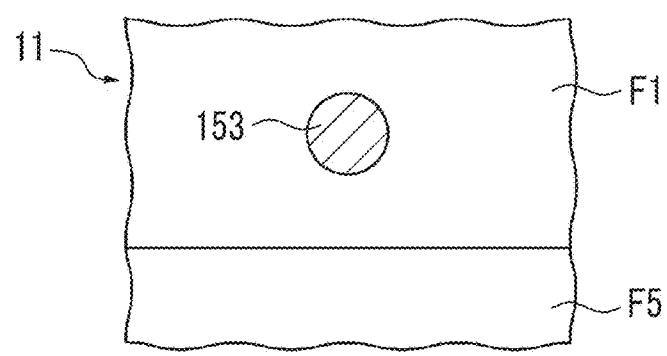
Figure 8A:
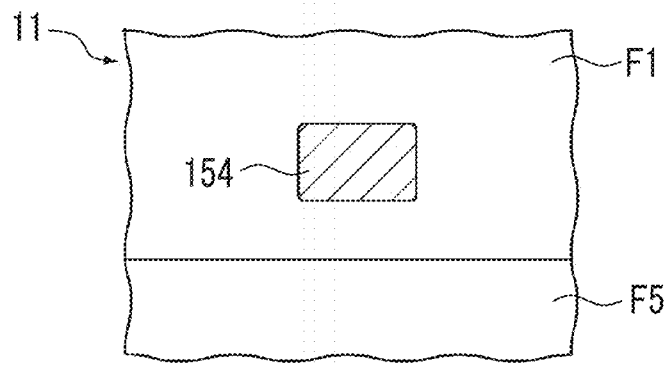
FIGS. 8A to 8D are views showing the shapes of protrusion portions of a forming device according to a modification example.
Figure 8B:
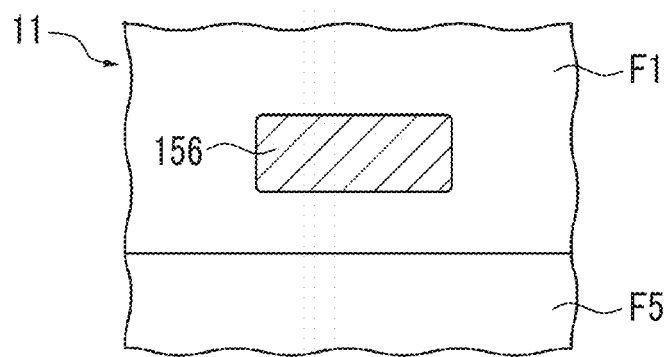
Figure 8C:
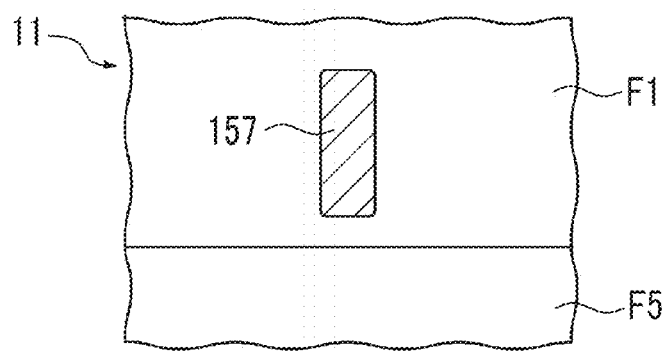
Figure 8D:
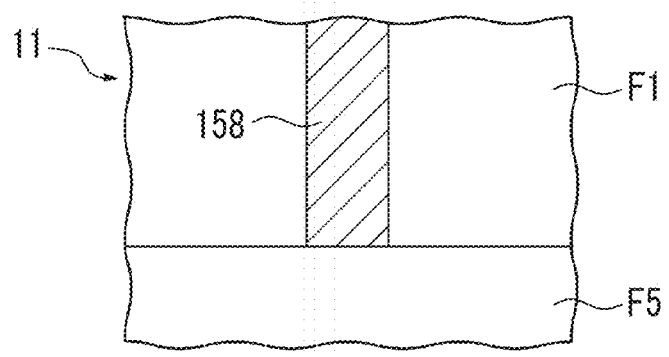

In addition, the shape of the protrusion portion (that is, the shape of the thin wall portion) is not limited that in the above-described embodiment and various shapes can be adopted. For example, as shown in FIG. 7A, a pair of protrusion portions 150 may continuously extend along the longitudinal direction of the flange forming surface. In addition, as shown in FIG. 7B, a pair of protrusion portions 151 may continuously extend along the longitudinal direction of the flange forming surface. In addition, as shown in FIG. 7C, protrusion portions 152 may have circular shapes arranged in two rows. As shown in FIG. 7D, the protrusion portion 153 may have a circular shape arranged in a row. As shown in FIGS. 8A and 8B, each of protrusion portions 154 and 156 may have a rectangular shape arranged in a row. As shown in FIG. 8C, a protrusion portion 157 may have a shape extending in the width direction. As shown in FIG. 8D, a protrusion portion 158 may have a shape extending over the entire flange forming surface in the width direction.

It should be understood that the invention is not limited to the above-described embodiment, but may be modified into various forms on the basis of the spirit of the invention. Additionally, the modifications are included in the scope of the invention.

What is claimed is:

1. A forming device which expands a metal pipe material to form a metal pipe having a pipe portion and a flange portion, the forming device comprising:
   a first die and a second die, which are paired with each other and include pipe forming surfaces for formation of the pipe portion and flange forming surfaces for formation of the flange portion;

a drive unit that drives at least one of the first die and the second die; and
a controller that controls the drive unit,
wherein, on at least one of the flange forming surface of the first die and the flange forming surface of the second die, a first protrusion portion and a second protrusion portion that protrude by an amount not to abut against the other flange forming surface when the dies are closed are formed, and a pair of flat surfaces extending from both ends of at least one of the first protrusion portion and the second protrusion portion along a longitudinal direction of the flange forming surface, and
wherein the controller controls the drive unit such that thin wall portions at which a thickness of the flange portion becomes partially small are intermittently formed at the flange portion along the longitudinal direction by the first protrusion portion and the second protrusion portion pressing the flange portion.

2. A forming device comprising:
a pair of dies comprising:
pipe forming surfaces that are configured to form a pipe portion of a metal pipe material,
flange forming surfaces that are configured to form a flange portion of the metal pipe material, each of the flange forming surfaces includes a step that protrudes from a bottom surface of the pipe forming surfaces, and
a protrusion portion that, when the dies are closed, protrudes from the step by an amount not to abut against an additional one of the flange forming surfaces;
a drive unit comprising:
a slide that is configured to move a first one of the dies toward a second one of the dies in a manner that causes the first one of the dies to come into contact with the second one of the dies; and
a controller configured to:
control, when the slide moves the first one of the dies toward the second one of the dies, the drive unit in a manner that causes the protrusion portion to come into contact with the flange portion so that the protrusion portion forms a thin wall portion of the flange portion,
wherein a thickness of the thin wall portion is smaller than a thickness of a portion of the flange portion excluding the thin wall portion.

3. The forming device according to claim 2, wherein the forming device is configured to expand the metal pipe material so as to form a metal pipe having the pipe portion and the flange portion.

4. The forming device according to claim 2, wherein the controller is configured to control the drive unit such that the thickness of the thin wall portion is set to about 30 to 70% of the portion of the flange portion excluding the thin wall portion.

5. The forming device according to claim 2,
wherein the first one of the dies and the second one of the dies include contact portions that come into contact with each other when the dies are closed, and
wherein the protrusion portion is formed inward of the contact portions in a width direction of the flange forming surface.

6. The forming device according to claim 5, wherein at least one of the contact portions is a portion that defines a tip of the flange portion.

7. The forming device according to claim 2, wherein the one of the flange forming surfaces comprises a second protrusion portion that, when the dies are closed, protrudes by an amount not to abut against the additional flange forming surface.

8. The forming device according to claim 7, wherein the protrusion portion and the second protrusion portion are intermittently formed at the one of the flange forming surfaces along the longitudinal direction of the one of the flange forming surfaces.

9. The forming device according to claim 7,
wherein the protrusion portion and the second protrusion portion are arranged in two rows to be separated from each other in the width direction of the one of the flange forming surfaces, and
wherein a size of each of the protrusion portion and the second protrusion portion is approximately 10% or more and less than 50% of a size of the one of the flange forming surfaces such that the flange portion is pressed locally.

10. The forming device according to claim 2,
wherein each of the first one of the dies and the second one of the dies includes a first protrusion, a second protrusion, a third protrusion, and a fourth protrusion, and
wherein the step is formed on each of the first one of the dies and the second one of the dies by the second protrusion, or the third protrusion, the protrusion protrudes from the step of the second protrusion or the third protrusion.

11. The forming device according to claim 10,
wherein the first protrusion and the second protrusion are formed on a right side of a center cavity of each of the first one of the dies and the second one of the dies, and
wherein the third protrusion and the fourth protrusion are formed on a left side of the center cavity of each of the first one of the dies and the second die.

12. The forming device according to claim 2, further comprising:
a heating mechanism that includes a power supply unit and an electrode which is electrically connected to the power supply unit, the heating mechanism is configured to electrically heat the metal pipe material.

13. The forming device according to claim 12, wherein the heating mechanism further includes a busbar which electrically connects the power supply unit and the electrode to each other.

14. The forming device according to claim 2, further comprising:
a gas supply mechanism that includes a cylinder unit, a cylinder rod, and a seal member; and
a gas supply unit that includes a gas source, an accumulator, a first tube, and a second tube,
wherein the gas supply unit is configured to supply a gas to the gas supply mechanism, and
wherein the gas supply mechanism is configured to supply the gas from the gas supply unit into the metal pipe material.

15. The forming device according to claim 14, wherein the cylinder rod moves forward and rearward in accordance with an operation of the cylinder unit, and the seal member is connected to a tip of the cylinder rod on a side of a holding mechanism which holds the metal pipe material.

16. The forming device according to claim 15, wherein a tapered surface is formed at a tip of the seal member so that the tip is tapered.

17. The forming device according to claim 15, wherein the gas supply unit further includes a first pressure control valve, a second pressure control valve, a switching valve, and a check valve.

18. The forming device according to claim 17,
wherein the first pressure control valve supplies a gas of an operation pressure adapted to a pressing force with respect to the metal pipe material to the cylinder unit,
wherein the check valve prevents a high-pressure gas from back-flowing in the second tube, and
wherein the second pressure control valve supplies a gas having an operation pressure for expanding the metal pipe material to a gas passage of the seal member.

19. The forming device according to claim 2, further comprising:
a water circulation mechanism that includes a water tank which stores water, a water pump which sends the water stored in the water tank to a cooling water passage, and a pipe.

* * * * *